Feb. 19, 1924.
C. W. STEELE
1,483,915
TIRE BOOT BUILDING MACHINE
Filed Jan. 15, 1919  6 Sheets-Sheet 3
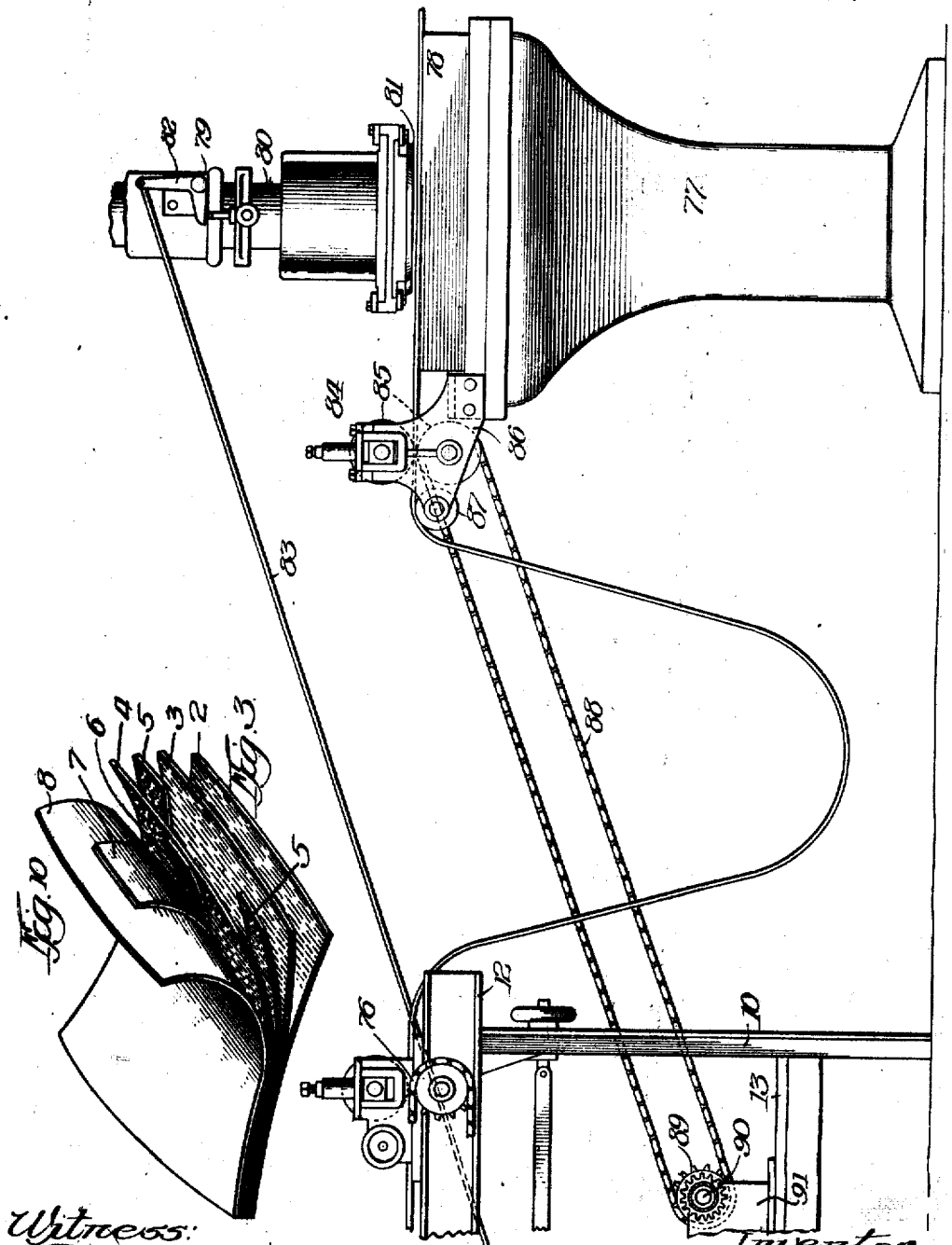

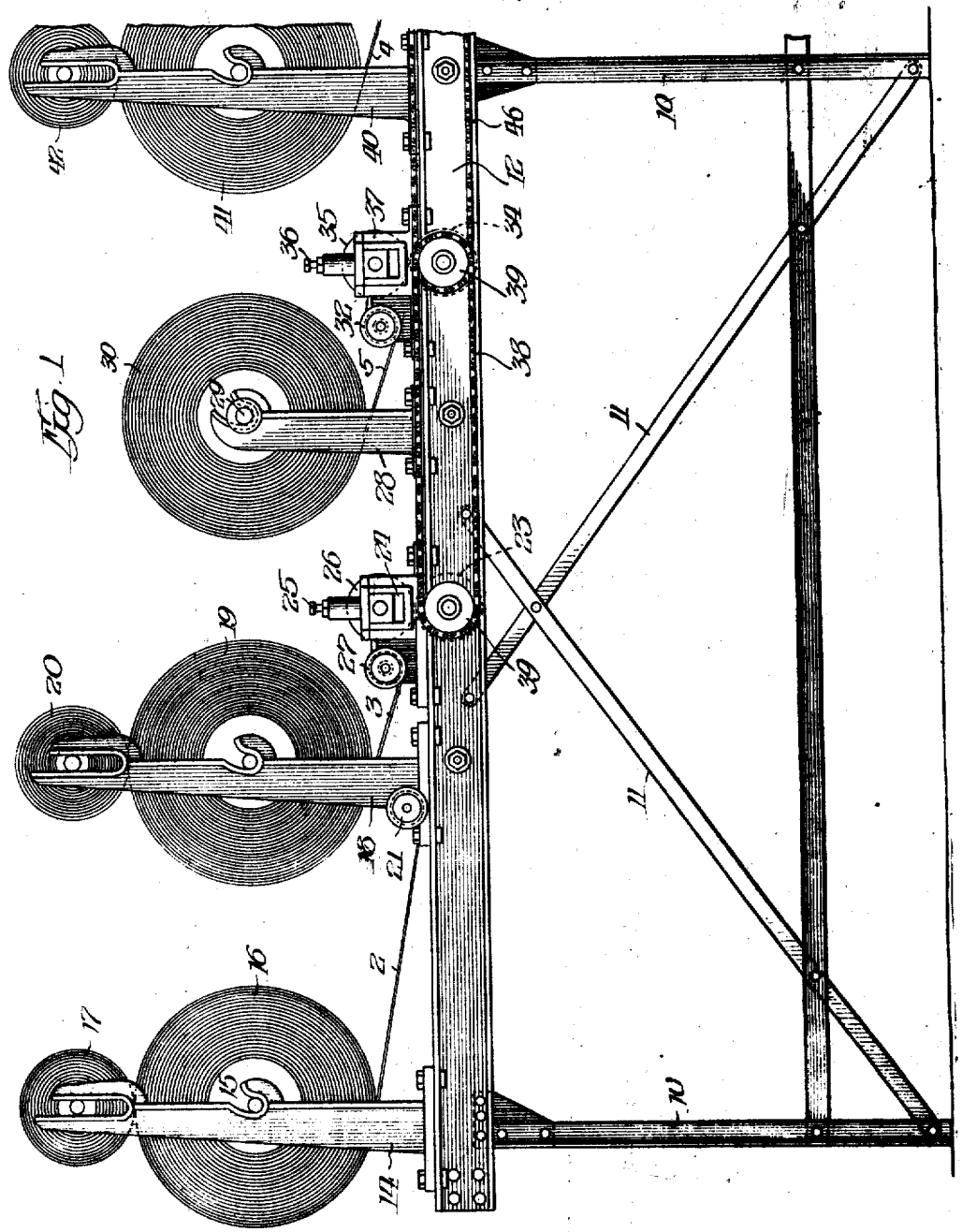

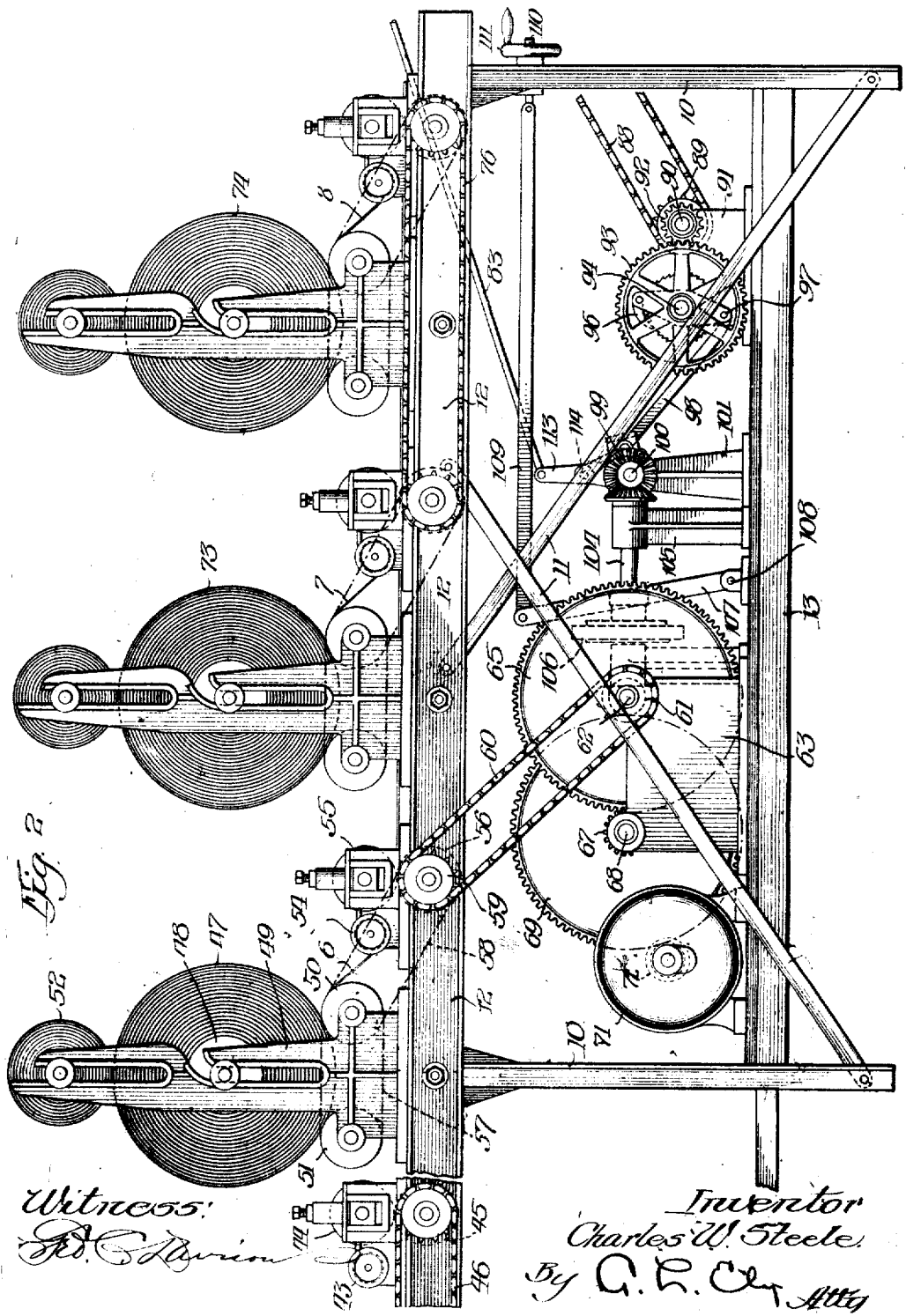

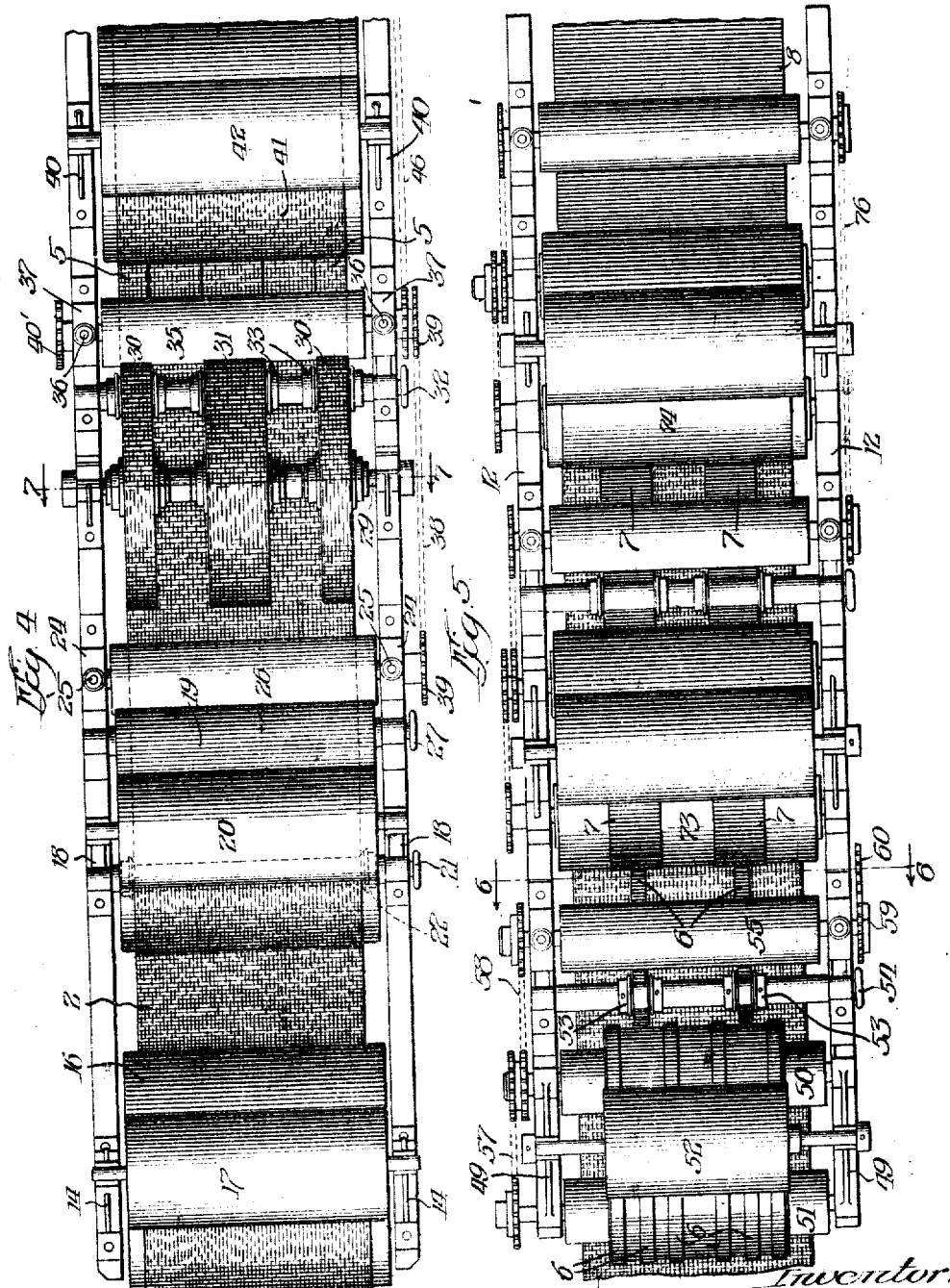

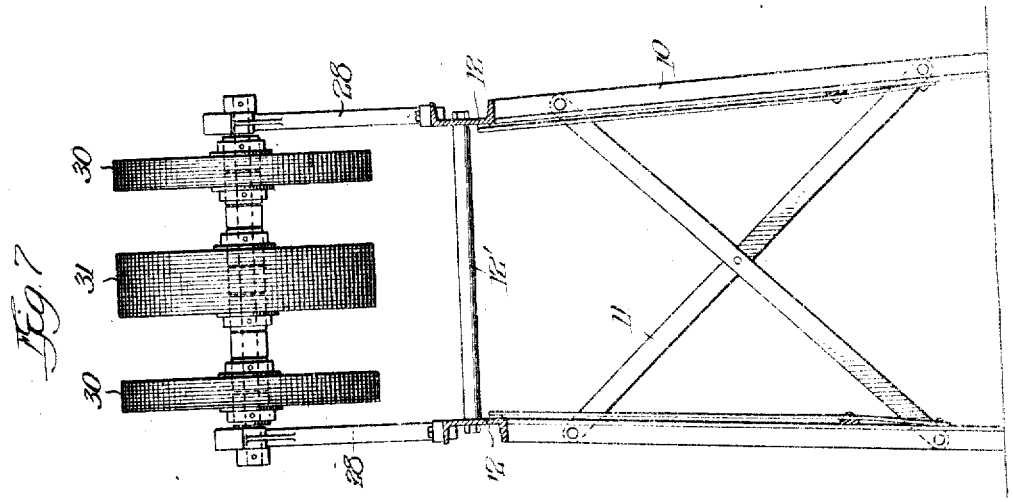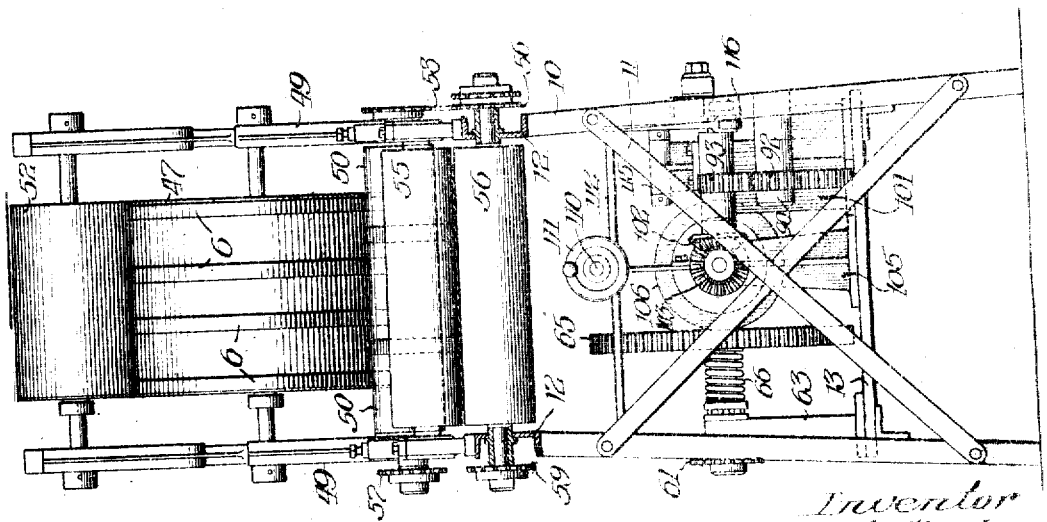

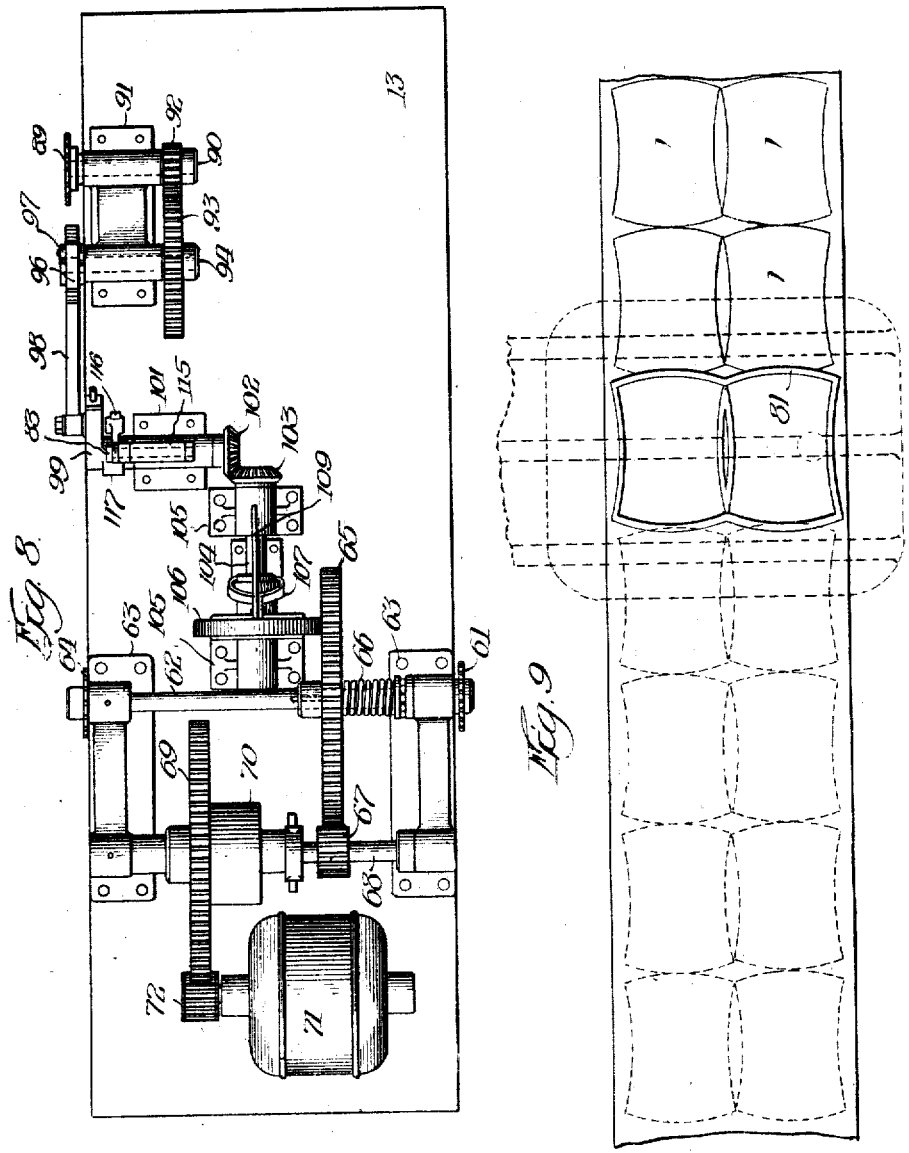

Patented Feb. 19, 1924.

1,483,915

UNITED STATES PATENT OFFICE.

CHARLES W. STEELE, OF AKRON, OHIO, ASSIGNOR TO THE FIRESTONE TIRE AND RUBBER COMPANY, OF AKRON, OHIO, A CORPORATION OF OHIO.

TIRE-BOOT-BUILDING MACHINE.

Application filed January 15, 1919. Serial No. 271,294.

*To all whom it may concern:*

Be it known that I, CHARLES W. STEELE, a citizen of the United States, residing at Akron, in the county of Summit, State of Ohio, have invented certain new and useful Improvements in Tire-Boot-Building Machines, of which the following is a specification.

The purpose of this invention is to construct a machine which will rapidly and efficiently manufacture articles of rubber and fabric which are known to the trade as "boots," being used to repair worn or blown out tire casings. Formerly it has been the practice to manufacture these articles by hand and it is the object of this invention to replace such hand manufacture by machine, constructing such articles more uniformly and rapidly.

Other objects and advantages will become apparent as the description proceeds, it being understood that changes and modifications may be made without departing from the essentials of the invention.

In the drawings:

Fig. 1 is an elevation of the forward end of the machine.

Fig. 2 is an elevation of the central portion of the machine, this view being a continuation to the right of Fig. 1.

Fig. 3 is an elevation of the rear end of the machine showing the cutting or clicking mechanism, this view being a continuation to the right of Fig. 2.

Fig. 4 is a plan view of the parts shown in Fig. 1.

Fig. 5 is a plan view of the parts shown in Fig. 2.

Fig. 6 is a section on the line 6—6 of Fig. 5.

Fig. 7 is a section on the line 7—7 of Fig. 4.

Fig. 8 is a plan view of the drive mechanism.

Fig. 9 is a plan view of the articles as cut out.

Fig. 10 is a perspective view of the boot showing the several layers of which it is constituted.

In order to understand the invention more clearly, the article which the machine is designed to make will first be described. It is designated by the numeral 1 and is shown in Fig. 10, and comprises a plurality of layers of heavy rubberized fabric 2, 3, and 4, forming the foundation of the boot. The specific number of layers may be changed, the machine being adaptable for manufacturing boots of a less number of plies by disconnecting one of the fabric rolls, or alterable into laying up a greater number of plies by adding other units, as will be readily understood.

Between two of the plies, preferably the second and third plies, are placed two narrow strips of rubberized fabric 5 along the edges of the boot. Centrally above the last fabric ply is placed a narrow strip of cushion rubber 6 and above this is placed a thicker and wider centrally arranged strip of more heavily compounded rubber 7. Above this is placed a thin layer of rubber 8 covering the whole area of the boot. The boot in the form shown in Fig. 10 is subsequently cured in any well known manner, and suitable securing means are applied to the edges in the form of hooks or lacing devices.

The machine comprises a number of legs 10 suitably braced as at 11 and carrying horizontal side bars 12, spaced by the rods 12', which support the rolls of fabric and rubber and the pressure and assembling rollers. Located at any suitable point, here shown between the rear uprights, is a platform 13 which supports the driving mechanism.

At the front of the machine on the side rails 12 are supported a pair of standards 14 provided with notches 15 supporting a reel 16 which furnishes the first layer of fabric 2. A liner take off roll 17 is supported above the roll 16 as is customary. A similar pair of uprights 18 support the roll 19 from which is obtained the second ply of fabric 3, the roll being provided with a liner rewind roll 20. On the lower part of the standard 18 is carried a roller 21 provided with guiding flanges 22 which center the fabric 2. Slightly ahead of the roll 19 there is carried in the side rails 12 a platen roll 23, above which is arranged a pair of slotted standards 24 in which is a pressure roller 26 mounted for vertical adjustment by set screws 25, between which rollers the two fabric layers 2 and 3 are passed and squeezed together. Before passing between the rollers 23 and 26, the fabric 3 passes beneath a guide roller 27 similar to the guide roller 21.

Spaced an equal distance from the standards 18 is arranged a pair of standards 28, in the upper end of which is seated a shaft 29, on which is carried a set of rolls of narrow fabric which form the strips 5. The fabric for the narrow strips may be formed in two rolls 30 which are of the same width as the strips in the finished product, which are located at the ends of the shaft 29, while in the middle of the shaft is positioned a roll 31 of double width, the machine being intended to construct two parallel rows of boots. This particular arrangement of rolls is not essential, but affords a convenient means for holding the fabric where duplicate boots are under construction. No liner being necessary for the narrow strips, no provision is made for it, although it may be applied if desired. A guide roll 32, similar to the guide rolls heretofore described, is arranged adjacent to standards 28, the collars 33 thereon being appropriately located. A platen roller 34 is carried by the side bars 12 near the guide roller and is surmounted by a pressure roller 35 adjustably held by set screws 36 in housings 37. The rollers 23 and 34 are interconnected for rotation by a sprocket chain 38 meshing with sprockets 39 on their respective shafts. The shaft of the roller 34 carries on the other side of the framework a second sprocket 40', which derives motion from a source to be described later.

Beyond the brackets 28 is arranged a third pair of brackets 40 which support the roll of fabric 41 from which the third ply 4 is constructed. This is similar to those previously described and is provided with a liner roll 42. From the roll 41, the ply 4 passes beneath a guide roller 43 and with the laminated strip already built up is led between pressure rollers 44 and 45 similar to those described heretofore. Rotation is imparted to the roller 45 by a chain 46 driven from the roll 34.

The machine as described up to this point will assemble the several layers of fabric, and it now becomes necessary to apply the several layers of rubber.

The first rubber to be applied is the narrow centrally arranged strip 6. This is supplied from a roll 47 carried on a drum 48 guided in a pair of standards 49. The roll is supported between two driven rolls 50 and 51 and carries a liner rewind roll 52. The strips of rubber 6 are preferably assembled in a plurality of convolutions between the liner, six being shown in Fig. 5, and the centrally arranged strips of each group are led between guiding flanges 53 on a roll 54, and into squeezing rolls 55 and 56 similar to those heretofore described. Such of the strips as are not used are rewound upon the roll 52, and when the two strips are exhausted, the rolls 52 and 48 are inverted, the position of the rolls being shifted along their shafts to bring a new pair of strips into line. This arrangement is not essential, but affords an efficient and economical means for handling the narrow strips of rubber.

The rollers 50 and 51, which support the roll 47, are connected by a sprocket chain 57, the roll 50 being driven by a chain 58 connected to the roll 56. On the roll 56 is supported a sprocket wheel 59 over which is carried a chain 60 leading to a sprocket gear 61 secured to a shaft 62 carried in brackets 63 rising from the platform 13. The far end of the shaft 62 carries a second sprocket gear 64, which drives the last two sets of rubber applying mechanism, as will be explained.

Splined to the shaft 62 is a large geared disk 65, which is urged along the shaft 62 by a coil spring 66 surrounding the shaft between the gear 65 and the forward bracket the purpose of which will appear in a later part of the description. The periphery of the disk meshes with a pinion 67, the shaft of which carries a gear wheel 69 adapted to be connected to the shaft by a clutch 70 operable by the machine attendant by any suitable lever mechanism. A motor 71 drives the gear 69 through an intermediate pinion 72.

The layers of rubber 7 and 8 are applied to the moving strip of rubber and fabric from rolls 73 and 74, respectively, the apparatus for carrying and applying the strips being similar to the devices for operating on the layer 6 and a further description is deemed unnecessary. Rotary motion for these last instrumentalities is derived from the shaft 62 through a sprocket chain 75, and connecting sprocket chain 76.

It will be seen that a laminated sheet of fabric and rubber is laid up by the machine described and issues from the end of the machine in a width designed to make two parallel rows of boots. Associated with the fabric and rubber laying machine described, up to this point, is a cutting device of any well known type, which is so arranged as to be operated in unison with the machine to cut out the rows of boots.

Any type of machine may be used to cut the boots, but I preferably make use of a well known type of apparatus called a "clicking machine," which is designated as 77, and may be of any standard make. It comprises a base, or bed, 78 and a head 79 which carries a plunger 80 to the lower end of which is secured a die 81 of the design shown in Fig. 9 which cuts the two boots at one operation. A trigger 82 causes the plunger to make one quick downward stroke when it is actuated. This plunger is moved by a rod 83, operated in a manner to be described.

On the end of the bed of the clicking machine is an intermittent feed device which receives the compound strip from the laying machine and feeds it into the clicker. The feeding device is designated by the numeral 84 and comprises a pair of adjustable rolls 85 supported in brackets 86 from the bed of the clicking machine. A guide roll 87 is carried in the brackets 86 and supports the strip which normally hangs in a loop beyond the end of the laying machine.

One of the rolls 85 is intermittently driven a distance sufficient to advance the strip of laminated material for a new cut, by means of a sprocket chain 88 which derives motion from a sprocket wheel 89 mounted on a shaft 90 in a bracket 91 rising from the bed 13. A pinion 92 is carried on shaft 90 and meshes with a gear 93 on a shaft 94 also supported in the bracket 91. The gear 93 is rotated intermittently by a ratchet wheel 95 on the shaft 94, co-operating with a pawl 96 on a lever 97 which is rocked by a link 98 connected to a crank 99. The crank 99 is adjustable in any well known manner to vary the amount of advance given to the fabric. The crank 99 is attached to a shaft 100 carried in a bracket 101 on the platform 13, the forward end of the shaft carrying a bevel pinion 102 in mesh with a bevel pinion 103 on a longitudinal shaft 104 carried in two brackets 105. Feathered on the shaft 104 is a friction wheel 106 which is maintained in contact with the rear face of the disk 65 by the spring 66. The friction wheel is arranged to be adjusted across the face of the disk by a lever 107 pivoted at 108, so that the speed of the cutting mechanism may be adjusted with relation to the speed of the laying part of the machine. The free end of the lever 107 is pivoted to a rod 109, the other end of which is pivotally connected to a screw threaded pin 110, received in a hand wheel 111, supported on a bar 112 extending between the rear pair of legs 10.

The clicker operating rod 83 is pivoted to a lever 113 provided with a pin 114 received in a bearing 115 on the upper end of the standard 101. Below the pin 114, the lever is extended to carry a roller 116 which rests on a cam surface 117 formed on the end of the shaft 100. By the construction shown, the movement of the fabric strip and the operation of the clicking machine may be alternated. By the adjustment of the friction wheel 106, the speed of the laying and cutting instrumentalities may be adjusted, and by the adjustment of the throw of the crank 99, the amount of advance of the fabric strip may be adjusted independently to provide for different size dies in the clicking machine.

The number and positioning of the several supply rolls may be varied without altering the invention, the type of fabric laying mechanism may be changed and other forms of cutting or dieing out mechanism may be substituted for that shown. Other changes and modifications may be made within the scope of the invention to which I consider myself entitled within the fair limits of the claims appended hereto.

I claim:

1. In a machine of the character described, the combination of means for forming continuously a strip of laminated material an intermittently actuated die press for cutting articles from said strip, feeding means located between the forming means and the die press, an adjustable driving connection from said forming mechanism to said die press and feeding means, and an independent adjusting device for governing the action of said feeding means.

2. A tire boot building machine having, in combination, a series of supply holders, means for forming a continuous strip composed of a plurality of layers from said holders, means for continuously actuating said forming means, an intermittently actuated die press for cutting tire boots from said continuous strip, means operable in timed relation to said cutting means for feeding said continuous strip to the cutting means, and means for relatively adjusting the speeds at which the feeding and cutting means operate.

3. A tire boot building machine having, in combination, a series of supply holders, means for forming a continuous strip composed of a plurality of layers from said holders, means for continuously actuating said forming means, an intermittently actuated die press for cutting tire boots from said continuous strip, means operable in timed relation to said cutting means for feeding said continuous strip to the cutting means, and means for adjusting the speeds at which the feeding and cutting means operate.

4. A tire boot building machine having, in combination, a series of supply holders, means for forming a continuous strip composed of a plurality of layers from said holders, an intermittently actuated means for continuously actuating said forming means, die press for cutting tire boots from said continuous strip, means for alternately feeding the strip and operating the cutting means, means for varying the speed of said forming and cutting means independently, and means for adjusting the amount of feed of the continuous strip independently of the operation of the cutting means.

CHARLES W. STEELE.